United States Patent
Vered et al.

(10) Patent No.: US 8,405,549 B2
(45) Date of Patent: Mar. 26, 2013

(54) DIRECTION FINDING METHOD AND DEVICE

(75) Inventors: Uri Vered, Rishon LeZion (IL); Yariv Erad, Kidron (IL); Gad Vered, Rishon LeZion (IL)

(73) Assignee: Hisep Technology Ltd., Yavne (IL)

( * ) Notice: Subject to any disclaimer, the term of this patent is extended or adjusted under 35 U.S.C. 154(b) by 178 days.

(21) Appl. No.: 12/993,118

(22) PCT Filed: Jun. 1, 2009

(86) PCT No.: PCT/IL2009/000542
§ 371 (c)(1),
(2), (4) Date: Nov. 17, 2010

(87) PCT Pub. No.: WO2009/147662
PCT Pub. Date: Dec. 10, 2009

(65) Prior Publication Data
US 2011/0068980 A1    Mar. 24, 2011

Related U.S. Application Data

(60) Provisional application No. 61/058,223, filed on Jun. 3, 2008, provisional application No. 61/163,047, filed on Mar. 25, 2009.

(51) Int. Cl.
*G01S 5/02* (2010.01)
(52) U.S. Cl. .......................... 342/417; 342/432
(58) Field of Classification Search .................. 342/417, 342/428, 432, 434; 455/13.3, 562.1
See application file for complete search history.

(56) References Cited

U.S. PATENT DOCUMENTS

| | | | |
|---|---|---|---|
| 5,402,132 A | 3/1995 | Hall et al. | |
| 5,617,102 A | 4/1997 | Prater | |
| 2007/0293150 A1 | 12/2007 | Ezal et al. | |

FOREIGN PATENT DOCUMENTS

EP    1610258    12/2005

OTHER PUBLICATIONS

Li Jinrui et al: "A new method to find the direction of radar signal", 1996 CIE Int'l Conf. of Radar Proceedings (IEEE Cat. No. 96TH8117 Publishing House of Electron, China, pp. 601-604,XP002553638.
IPRP Chapter I for corresponding PCT application—mailed on Dec. 6, 2010.

*Primary Examiner* — Dao Phan
(74) *Attorney, Agent, or Firm* — Roach Brown McCarthy & Gruber, P.C.; Kevin D. McCarthy

(57) ABSTRACT

A method for determining whether a target is within a direction sector of interest of a direction finder and a device for carrying out the method are disclosed. The method calls for (a) predefining the sector of interest; (b) providing at least two antennas; (c) generating an in-phase reference pattern, and establishing wireless communication between the direction finder and the target; (d) attenuating the wireless communication signal between the direction finder and the target and recording the attenuation value which corresponds to the loss of wireless communication as the R reference value; (e) generating an out-of-phase null pattern, and re-establishing wireless communication between the direction finder and the target; (f) repeat step (d) except this time recording the attenuation value which corresponds to the loss of wireless communication as the N null value; (g) determining whether the difference R−N is above or below the threshold difference.

20 Claims, 10 Drawing Sheets

DIRECTION FINDING METHOD AND DEVICE

REFERENCE TO CO-PENDING APPLICATIONS

Priority is claimed as a 371 of international application number PCT/IL2009/000542, filed on Jun. 1, 2009, which claims priority to (a) U.S. provisional patent application Ser. No. 61/058,223, filed on Jun. 3, 2008 and (b) U.S. provisional patent application Ser. No. 61/163,047, filed on Mar. 25, 2009.

FIELD OF THE INVENTION

The present invention relates to the field of determining the direction to a wireless communication source. More particularly, the invention relates to a system and method for finding the direction to one or more wireless communication sources by aiming and pointing a direction finder or by scanning various directions relative to the pointing direction of the direction-finding device.

BACKGROUND OF THE INVENTION

The art has provided many ways for a direction finder (DF) to determine the direction to an RF source (target), mainly by various wave analysis procedures.

Direction finding techniques can be categorized in groups, those which find the direction of the target based on the received signal amplitude, based on the received signal phase, based on received signal timing, or those which are based on several of said attributes of the received signal.

One of the major challenges all direction-finding techniques face, in most situations, but mainly within a reflective environment, is to overcome the multipath reflections problem. Multipath reflections can cause false indications regarding the direction of the targeted RF source. Reflection of waves is expected from nearby objects, such as walls, or metallic objects. Waves transmitted from a target may be scattered and reflected from nearby objects such as wall, and arrive to the direction finder via many waves and from many directions. The reflected waves are weaker due to the following facts: (a) the reflected waves travel a loner path; (b) The reflected waves are scattered to many directions; and (c) the reflected waves from an object suffer from reflection losses. The reflected waves arrive at the DF later than the direct wave due to the longer path. These reflections are combined with the direct wave, distorting the amplitude, phase, and time of arrival of the signal. In prior art direction finding techniques that are based on measuring the signals amplitude, phase, or time of arrival, these multi-path reflections cause sever errors in the direction finding.

Amplitude-based direction finding techniques: These direction finding techniques use one or more antennas. An example of a single antenna direction finding is a rotational directional antenna. The direction from which the received signal strength (RSS) or received signal strength indication (RSSI), or equivalent thereof is the highest, is the expected direction to the target. Amplitude based directional finders that use several antennas measure the RSS/RSSI at each antenna and calculate from these amplitude differences the Angle of Arrival (AOA) of the signal. An example for an amplitude directional finder which uses several antennas is the monopulse system.

Additional techniques assess the distance to the target, based on the signal strength, and by triangulating several measurements calculate the location or the direction to the target.

Phase-based direction finding techniques: These directional finders use two or more antennas and measure the phase difference of the arrival of a signal in plurality of antennas and calculate from these phase differences the AOA of the signal. This group includes, for example, interferometer direction finder, correlative interferometer direction finder, passed array systems, etc.

Time-based directional finder techniques: These directional finders are also known as TOA (Time of Arrival) type directional finders. They use two or more antennas and measure the time difference of the arrival of a signal to plurality of antennas and calculate from these differences the AOA of the signal. This group includes, for example short and long base TOA, DTOA (Differential Time of Arrival) etc.

Monopulse DF techniques: This technique is mainly used in ELINT (Electronic Intelligence) systems and radars, to find the direction from which a pulsed radar signal or echo is received. The signal is received in two or more directional antennas. The signals in the antennas, usually highly directional antennas, are added in phase to create a sum ($\Sigma$) signal, and added in opposite phase to create a Difference ($\Delta$) signal, in one or two dimensions, azimuth, elevation or both. Based on the $\Sigma$ and $\Delta$ signal strengths, the direction of the target is determined.

All said prior art techniques rely on one or more properties of the received signal, and therefore require relatively complicated calculations and analysis, and are also relatively expensive. Therefore, said techniques are generally not suitable for small size and relatively simple wireless personal devices, such as cellular phones, PDAs, digital cameras, remote-control devices. Such devices are small in size, are provided in many cases with two or more simple omni directional or very low gain directional antennas, and are relatively of low cost. Furthermore, in many cases such devices comprise of only one receiving channel for each antenna, and therefore are not suitable for using the abovementioned prior art techniques, unless significantly increasing their size, and or price.

US 2007/0293150 A1 discloses a compact antenna system for polarization sensitive null steering and direction finding.

EP1610258A1 discloses a tag reader/writer for communicating radio frequency identification tags through radio wave that includes position calculating section which calculates position of RFID tag based on estimated incoming direction of radio wave from RFID tag. The incoming direction of the radio wave is estimated by a direction estimation section, as the radio wave travels from the RFID tag to at least one antenna. However, this tag reader/writer also uses signal strength and is therefore limited to RSSI protocols.

The article "A new method to find the direction of radar signal" (by Li Jinrui et. al., Radar Proceedings, CIE International Conference of Volume, 8-10 Oct. 1996 pp:601-604) discloses a direction finding technique according to which a directional pulse amplitude information is obtained by taking an omni-directional channel as a reference and finding the pulse amplitude among directional beams. However, this technique (intended to look for radar pulses) uses signal strength and therefore requires many directional antennas and is limited to RSSI protocols.

It is an object of the present invention to provide such a direction finding technique and device that are invulnerable to reflections of the signal from nearby objects, such as walls.

It is an object of the present invention to provide a direction finding technique and device, for determining those wireless communicating devices that are located within a predefined direction sector of interest.

It is still an object of the present invention to provide such direction finding technique and device that are simple and reliable.

It is still another object of the present invention to provide a direction finding technique and device that do not depend on attributes of the signal such as its amplitude, phase, or time of arrival.

It is another object of the present invention to provide such direction finding technique and device that are compact in size, and therefore well adapted to small and relatively cheap personal devices, such as cellular phone, PDAs, digital camera, remote controls, etc.

It is still another object of the present invention to provide such direction finding technique and device that can further discriminate between wireless communicating devices that are located at the front and those that are located at the back of the device.

Other objects and advantages of the invention will become apparent as the description proceeds

SUMMARY OF THE INVENTION

The invention relates to a method for determining whether a target is within a direction sector of interest of a direction finder, which comprises: (a) predefining said sector of interest as a specific threshold difference between an R reference value and an N null value; (b) providing at least two antennas arranged in a broad-side configuration within the direction finder; (c) generating an in-phase reference pattern using at least one of said antennas, and establishing wireless communication between the direction finder and said target; (d) attenuating the wireless communication signal between the direction finder and said target until the wireless communication is lost, and recording the attenuation value which corresponds to said loss of wireless communication as the R reference value; (e) generating an out-of-phase null pattern using at least two of said antennas, and re-establishing wireless communication between the direction finder and said target; (f) attenuating the wireless communication signal between the direction finder and said target until the wireless communication is lost, and recording the attenuation value which corresponds to said loss of wireless communication as the N null value; (g) determining whether the difference R–N is above or below said threshold difference, wherein a difference R–N above said threshold is an indication that the target is within said direction sector of interest, and wherein a difference R–N below said threshold is an indication that the target is out of said direction sector of interest;

In an embodiment of the invention, a loss of wireless communication is a loss of handshake between the direction finder and the target.

In an embodiment of the invention, a larger difference R–N is an indication that the direction to the target is closer to a central axis of said direction sector of interest.

In an embodiment of the invention, the smaller said predefined threshold value is, the narrower said direction sector of interest becomes, and vice versa, the larger said predefined threshold is, the a wider said direction sector of interest becomes.

In an embodiment of the invention, the order of generation of the reference and null patterns, including said corresponding attenuations and recordings is replaceable.

In one embodiment of the invention, the attenuated signal is the received signal at the direction finder. In another embodiment of the invention the attenuated signal is the transmitted signal from the direction finder or a combination of both received and transmitted signal.

In an embodiment of the invention, said attenuations begin from 0 dB attenuation, and the attenuation values are measured in dB. According to one embodiment of the invention, the attenuations are performed gradually. According to another embodiment of the invention, said attenuations are performed according to a specific selected procedure until said loss of wireless communication.

In an embodiment of the invention, the order of determination of N and R respectively is replaceable.

In one embodiment, the method of the invention further provides a back vs. front discrimination, by further comprising: (a) providing at least two antennas that are arranged in an end-fire configuration within the direction finder; (b) generating a quadrature phase cardioid reference pattern using at least two of said antennas that are arranged in an end-fire configuration, and establishing wireless communication between the direction finder and said target; (c) attenuating the wireless communication signal between the direction finder and said target until the wireless communication is lost, and recording the attenuation value which corresponds to said loss of wireless communication as the $R_c$ reference value; (d) generating another quadrature phase cardioid null pattern using at least two of said antennas that are arranged in an end-fire configuration, and re-establishing wireless communication between the direction finder and said target; (e) attenuating the wireless communication signal between the direction finder and said target until the f wireless communication is lost, and recording the attenuation value which corresponds to said loss of wireless communication as the $N_c$ null value; (f) determining whether the difference $R_c$–$N_c$ is positive or negative, wherein a positive $R_c$–$N_c$ is an indication that the target is located to the front of the direction finder, and wherein a negative $R_c$–$N_c$ is an indication that the target is located to the back of the direction finder.

In an embodiment of the invention, said reference and null cardioid patterns are generated while introducing a 90° phase shift at a front and back of said end-fire antennas, respectively.

In an embodiment of the invention, the generation of the in-phase reference pattern and of the out of phase null pattern, as well as the respective attenuations of the signals, are performed digitally by a processing unit.

In an embodiment of the invention, the generation of the quadrature phase cardioid reference pattern and of the another quadrature phase cardioid null pattern, as well as the respective attenuations of the signals are performed digitally by a processing unit.

Preferably, said processing unit receives $I_1$ and $Q_1$ from a first receiver which in turn receives the signal via a first of said two antennas, and $I_2$ and $Q_2$ from a second receiver which in turn receives the signal from a second of said two antennas, and said processing unit outputs a newly calculated corresponding I and Q to a baseband component.

The invention also relates to a direction finder for determining whether a target is within a predefined direction sector of interest, which comprises: (a) at least two antennas that are arranged in a broad-side configuration; (b) a wireless communication unit for establishing communication with a target via a wireless communication signal; (c) a variable attenuator for attenuating said wireless communication signal; (d) a hybrid junction of preferably 180° for enabling wireless communication of said signal via said antennas in a generated in-phase or out-of phase patterns; and (e) a processing unit for: (e.1) switching at a stage 1 the hybrid junction to generate an in-phase pattern, attenuating the signal until the wireless communication is lost, and recording the attenuation value which corresponds to said loss of wireless communication as an R reference value; (e.2) switching at a stage 2 the hybrid junction to generate an out-of-phase pattern, attenuating the signal until the wireless communication is lost, and recording the attenuation value which corresponds to said loss of wireless communication as an N null value; (e.3) determining the difference R−N, wherein a difference above a predefined threshold means that the target is within said direction sector of interest, and a difference below said predefined threshold means that the target is out of said direction sector of interest.

According to an embodiment of the invention, the direction finder also discriminates between targets that are in the front or back of the direction finder, by further comprising: (f) a phase shifter for preferably 90°; (g) at least two antennas that are arranged in an end-fire configuration; (h) and wherein said processing unit is further used for: (h.1) switching at a stage 3 the phase shifter to generate a quadrature phase cardioid reference pattern at said two antennas that are arranged in an end-fire configuration, attenuating the signal until the wireless communication is lost, and recording the attenuation value which corresponds to said loss of wireless communication as an $R_c$ cardioid reference value; (h.2) switching at a stage 4 the phase shifter to generate another quadrature phase cardioid null pattern at said two antennas that are arranged in an end-fire configuration, attenuating the signal until the wireless communication is lost, and recording the attenuation value which corresponds to said loss of wireless communication as an $R_c$ cardioid null value; (h.3) determining the difference $R_c-N_c$, wherein a positive difference indicates that the target is to the front of the direction finder, and a negative difference indicates that the target is to the back of the direction finder.

DETAILED DESCRIPTION OF PREFERRED EMBODIMENTS

Definition of Terms

"Wireless Communication"—refers to the transfer of information and/or data and/or packets (formatted blocks of data) of any type or level and/or voice over long or short distances without the use of electrical conductors or "wires" but via Radio waves, at any given frequency.

"Wireless Communication Protocol and/or Standard"— shall refer to any protocol and/or standard used to conduct wireless communication, such as, but not limited to, wireless information technology, cellular communication (such as, but not limited to, GSM, GPRS, CDMA), wireless networks, WLAN computer communications, wireless networking standards, such as, IEEE 802.11), wireless personal area networks (WPAN) and wireless mesh networks. (it should be clearly noted that among such protocols, but not limited only to them, are Wi-Fi, Bluetooth, Wi-Max, ZigBee, Z-wave, Insteon, cellular devices communication protocols, Near-Field Communication (NFC), RFID protocols or standards, etc.

Direction finder or DF" refers to a device which is used to determine the relative direction to a target as defined hereinafter. Alternatively the device is used to find whether one or more targets are located within a desired direction from the finder. Said DF can be a stand-alone device or integrated into another electronic device, either via software or hardware or a combination of both.

"Target"—Target refers to a wireless communication device, or an RF communication source, which comprises RF transmitter and/or receiver and/or repeater or transponder and/or tag, which communicates wirelessly directly (i.e., not via relays) with the DF.

"Identification Data or ID"—refers to a number, either serial or other, a name, a collection of symbols, or any other type of reference, or data, or information which is used to provide the target a unique identification.

The present invention relates to method and system for detecting by a direction finder device (hereinafter referred to as DF) the direction to one or more wireless communication sources, hereinafter referred to as "targets". More specifically, the present invention provides means for determining whether one or more targets are located within a sector of interest. In contrast to conventional methods of the prior art, the invention does not consider, or depends on the received signal or wave attributes, such as amplitude, phase, time of arrival, or any other technical attribute. In other terms, the present invention obtains said direction finding without performing any wave analysis. Rather than that, the present invention is based on wireless communication existence or no existence, and induced wireless communication loss between the DF and the target.

Figure 1:
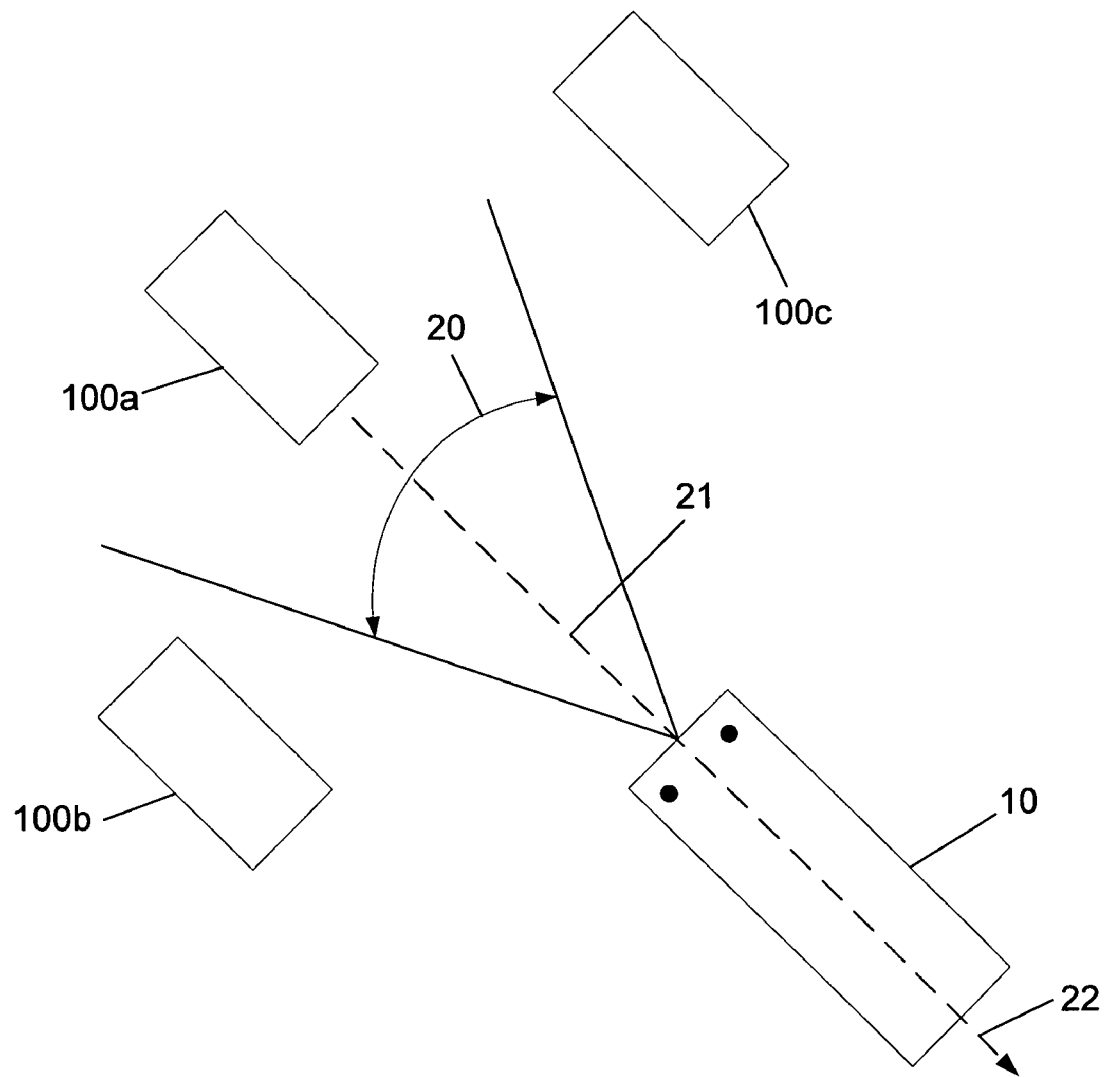
FIG. 1 shows a direction finder according to an embodiment of the present invention, whose objective is to determine those targets that are located within a sector of interest.

FIG. 1 shows a direction finder 10 according to an embodiment of the present invention, whose object is to determine those targets 100a, 100b, 100c . . . etc. that are located within a sector of interest 20, and optionally also to provide indication as to the proximity of each target to the central axis 21 of the direction sector of interest 20. Each of the targets is a wireless communication source which is an RF transmitter or transceiver, repeater or transponder or a tag whose existence and/or ID and or direction has to be found by the DF. As noted above, the present invention performs said tasks without relying on any of the wave or signal properties.

Figure 2:
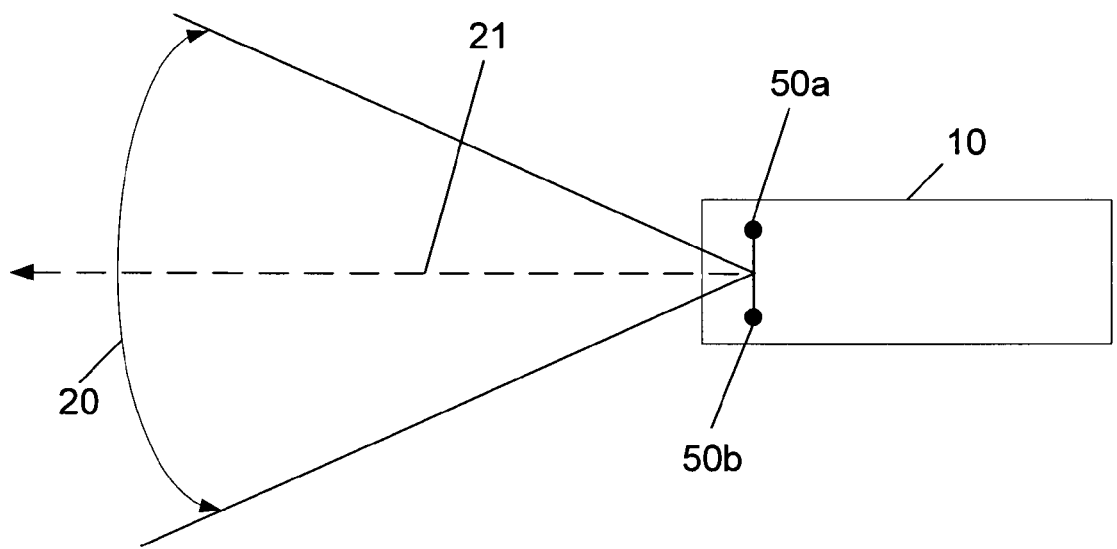
FIG. 2 shows a direction finder according to an embodiment of the invention, which comprises two antennas that are arranged in a broad-side configuration.

FIG. 2 shows a direction finder 10 according to one embodiment of the invention. The direction finder 10 comprises two antennas 50a and 50b that are arranged in a broadside configuration, i.e., the central axis of the sector of interest is perpendicular to the line connecting the two antennas. Typical distance between the antennas is a quarter of the wavelength $\lambda$, and usually not more than half the wavelength $\lambda$.

The direction finding of this invention is based on the use of two antenna patterns, which will be referred herein as "reference" and "null" patterns (R and N respectively). The direction finding is performed in three major stages. The first stage ("stage 1") is performed while the reference pattern is generated, and the second stage ("stage 2") is performed while the null pattern is generated. In a third stage, a comparison between the previous patterns is made to infer if the target is within the sector of interest.

Figure 3:
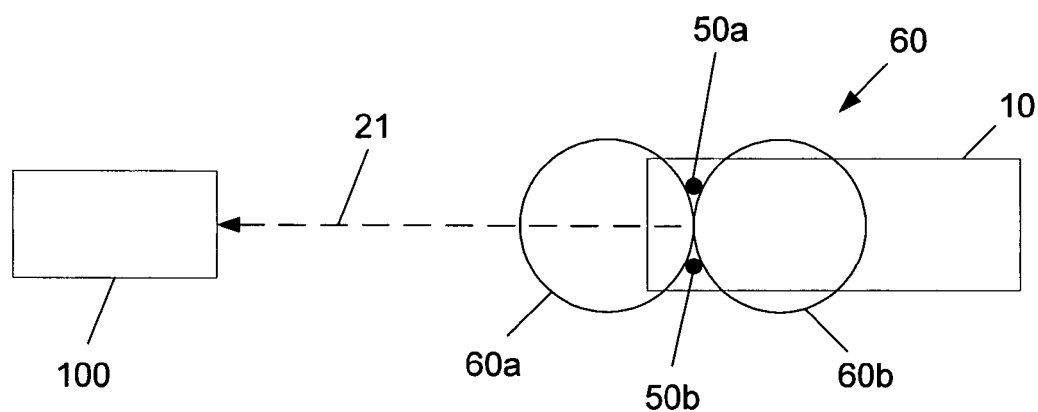
FIG. 3 shows the general form of the in-phase reference pattern, according to an embodiment of the present invention.

FIG. 3 shows the general form of the reference pattern. The reference pattern 60 is generated by an in-phase combination of the signals of the two antennas 50a and 50b, which forms an "8-shaped" pattern that comprises a front lobe 60a, and back lobe 60b. The front lobe 60a is directed toward central axis 21.

Figure 4:
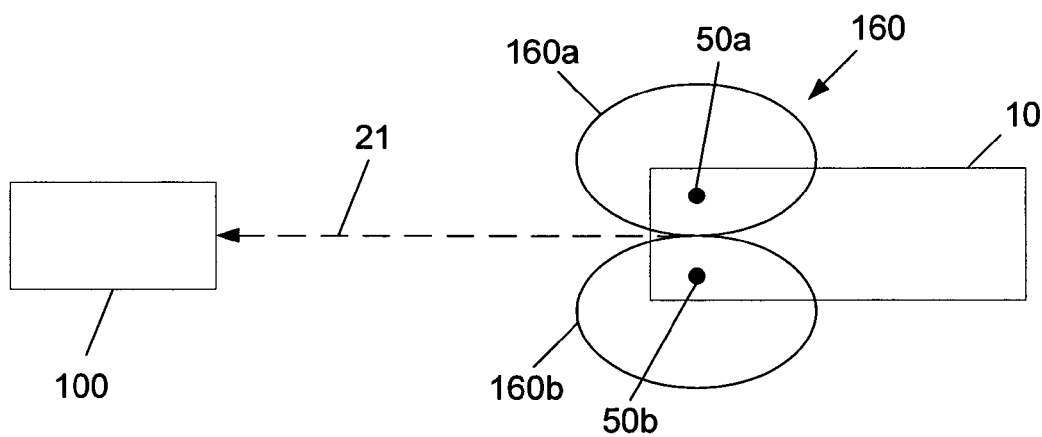
FIG. 4 shows the general form of the out-of-phase null pattern, according to an embodiment of the present invention.

FIG. 4 shows the general form of the null pattern. The null pattern 160 is generated by an out-of-phase combination of the signals of the two antennas 50a and 50b, which also forms an "8-shaped" pattern which is rotated by 90° with respect to the reference pattern of FIG. 3. The null pattern also comprises upper lobe 160a, and lower lobe 160b. The null between said two lobes is directed towards the central axis 21.

Figure 5:
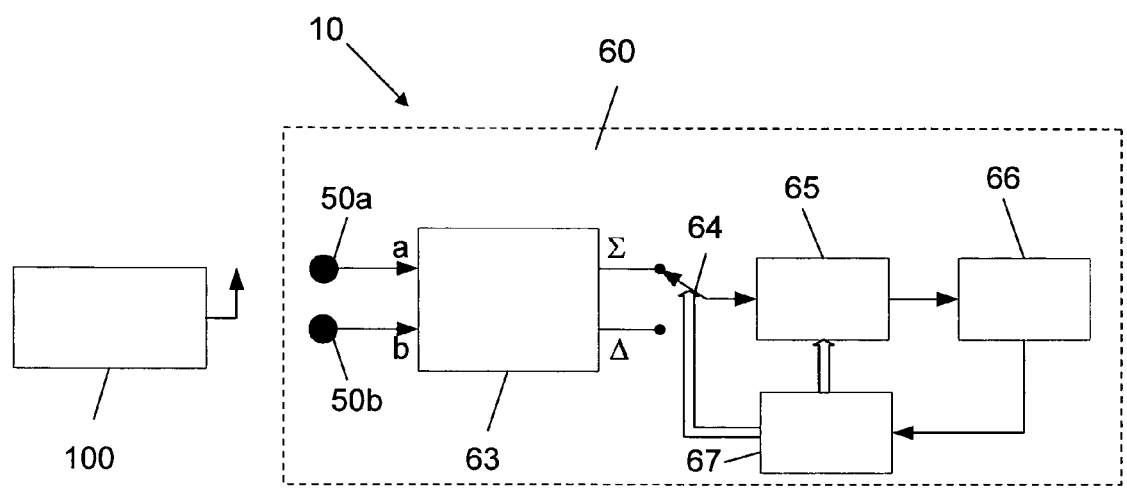
FIG. 5 illustrates a general structure of the direction finder, according to a first hardware embodiment of the invention.

FIG. 5 illustrates the general structure of the direction finder 10, according to a first hardware embodiment of the invention. The direction finder comprises a conventional wireless communication unit 66 that communicates with a similar wireless communication unit (not shown) of the target 100. The 180° hybrid junction 63 is used to generate the reference and null patterns 60 and 160 (of FIGS. 3 and 4) respectively. The hybrid junction 63 is connected at its port a to antenna 50a, and at its port b to antenna 50b. The reference (i.e., in-phase) pattern 60 is generated at the $\Sigma$ (sum) port and the null (i.e., out-of-phase) pattern 160 is generated at the $\Delta$ (difference) port. Switch 64 selects between the usage of the reference pattern at the first stage, and the usage of the null pattern at the second stage. Controlled attenuator 65, which is an essential element of the invention, is used for indirect measurement of the relevant antenna pattern value at the direction of the target, using a communication yes/no principle. More specifically, the communication yes/no principle operates as follows: Processing unit 67 accepts from the wireless communication unit 66 the information whether communication with target 100 exists or not. The processing unit controls switch 64, and controlled attenuator according to the following DF procedure. First, in stage 1 the attenuation of attenuator 65 is set to 0 dB, and a communication between the wireless communication units of the direction finder 66 and the target is established. Establishment of communication is regarded as "yes" when data handshake between the two wireless communication units is acquired. Loss of communication, i.e., "no" communication is regarded when data transfer between the two wireless communication does not exist, for example, due to loss of handshake. Attenuation in the wireless communication pass is deliberately introduced by controlled attenuator 65 until communication is lost. More specifically, the attenuation is gradually increased, until loss of communication. In stage 1, i.e., when the reference pattern is used, the minimal attenuation required to lose communication is recorded, and noted R in dB units. Similarly, by switching switch 64 from $\Sigma$ to $\Delta$ port in stage 2, i.e., when the null pattern is used, the minimal attenuation required to lose communication is recorded also, and noted N in dB units. The values of R and N directly depend on the direction to the target, and on the active pattern (i.e., the pattern which is used at that time).

Figure 6A:
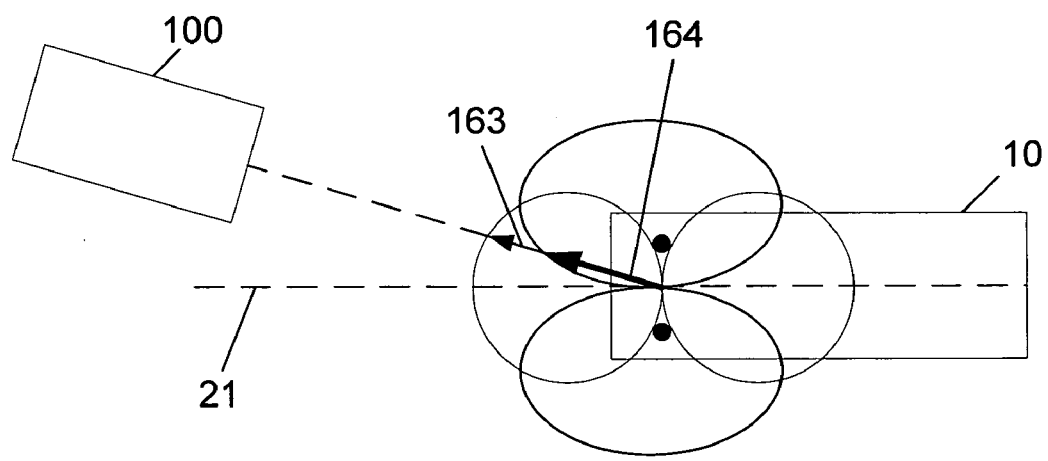
FIG. 6a shows a situation when a target is positioned off the central axis of the direction sector of interest during generation of reference and null patterns respectively, and the corresponding vectors R and N that represent the attenuation which is required to lose communication in each of said cases.
Figure 6B:
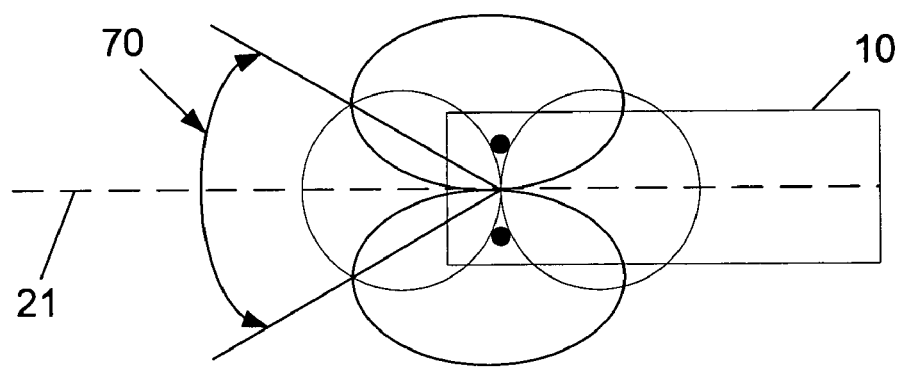
FIG. 6b shows the sector in which (R−N≧0), relative to the reference and null patterns respectively.

FIG. 6a shows a situation in which target 100 is positioned off the central axis 21. In that case, the vector 64 represents the R attenuation required to lose communication in stage 1. The closer the direction of target 100 to the central axis 21, the larger R value becomes. Similarly vector 164 represents the N attenuation required to lose communication in stage 2. However, in stage 2, the closer the direction of target 100 to the central axis 21, the smaller N value becomes. When the direction to target 100 coincides with axis 21, R becomes maximal, and N becomes minimal. On the other hand, when the direction to target 100 is 90° off the central axis 21, N becomes maximal, and R becomes minimal. FIG. 6b shows the sector 70 in which (R−N≧0). The larger the difference R−N is, the closer the target direction to the central axis 21 is. The definition of the sector width can be controlled by requiring R−N≧X. When X≧0, the sector 70 width is narrowed, and when X≦the sector width is broadened.

Figure 7:
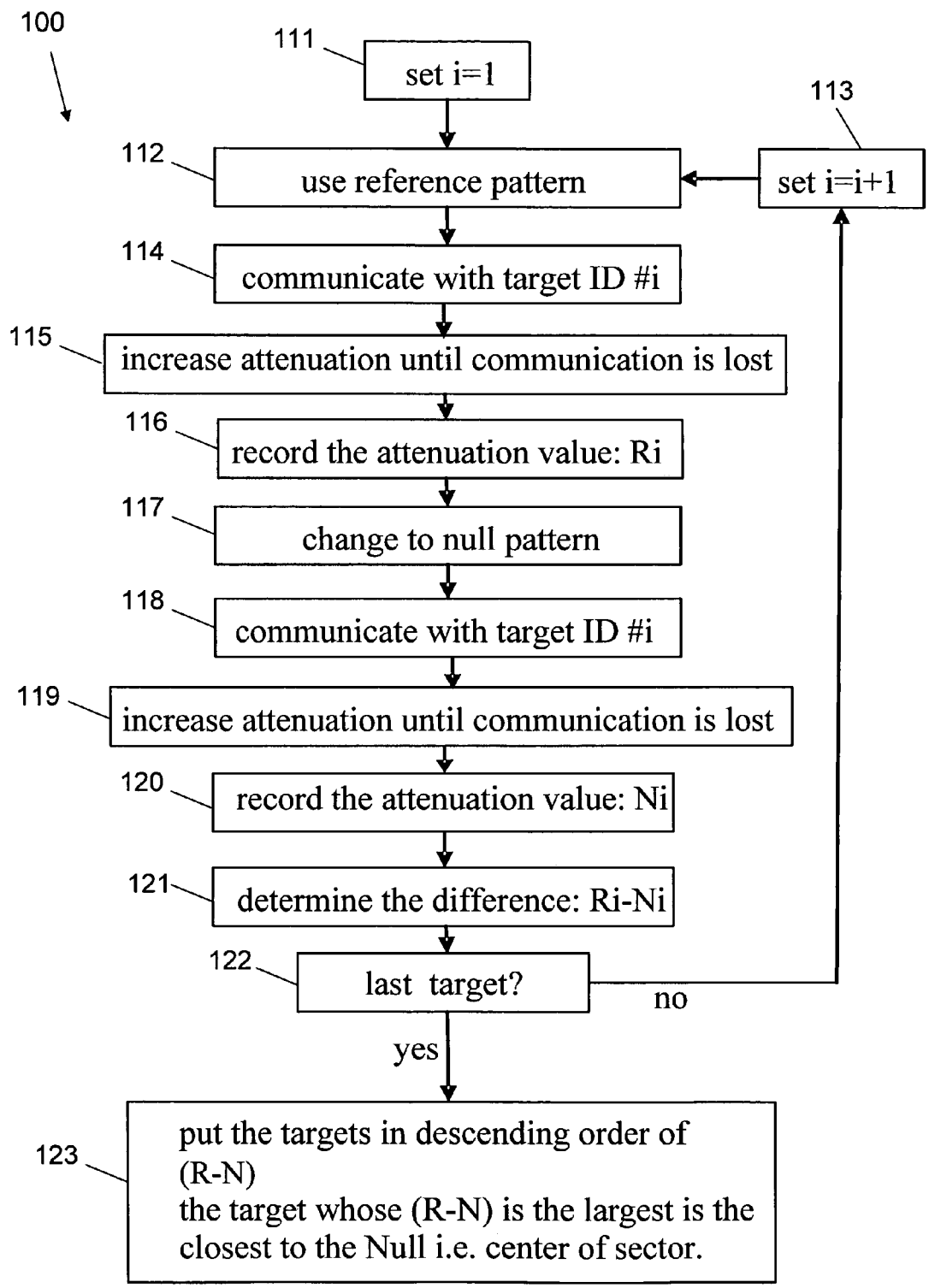
FIG. 7 is a flow diagram for determining the direction to a target when several targets are present.

FIG. 7 is a flow diagram illustrating a procedure 100 for determining the direction when several targets are present (i.e., having wireless communication directly with the DF). In step 111, an index i, which represents a number which is assigned to each target ID, is set to 1. Next, the reference pattern is activated in step 112, by switching switch 64 (FIG. 5) to the $\Sigma$ position. In step 114, a communication is established with a target #i. Next, in step 115, the attenuation is increased until loss of communication, and in step 116, the attenuation value R corresponding to the point of loss of wireless communication is recorded. In step 117, switch 64 is turned to the $\Delta$ position, the attenuation is zeroed, and again communication is established in step 118 with target #i using a null pattern. In step 119, the attenuation is again increased until loss of communication. In step 120 the attenuation value N corresponding to the point of loss of wireless communication is recorded. In step 121, the value of Ri−Ni is determined, and recorded. In step 122, the procedure checks whether all targets have bean treated. In the negative case, the index i is increased by 1 in step 113, and the procedure repeats from step 112 for the new target corresponding to the present I (of step 113). If, however, the answer in step 122 is yes, an analysis of all recorded values of Ri−Ni is performed in step 123. More specifically, in step 123 the targets are arranged in descending order according to their determined Ri−Ni values. Furthermore, it can be concluded that the target with index i whose Ri−Ni value is largest, is the closest to the sector central axis 21.

Figure 8:
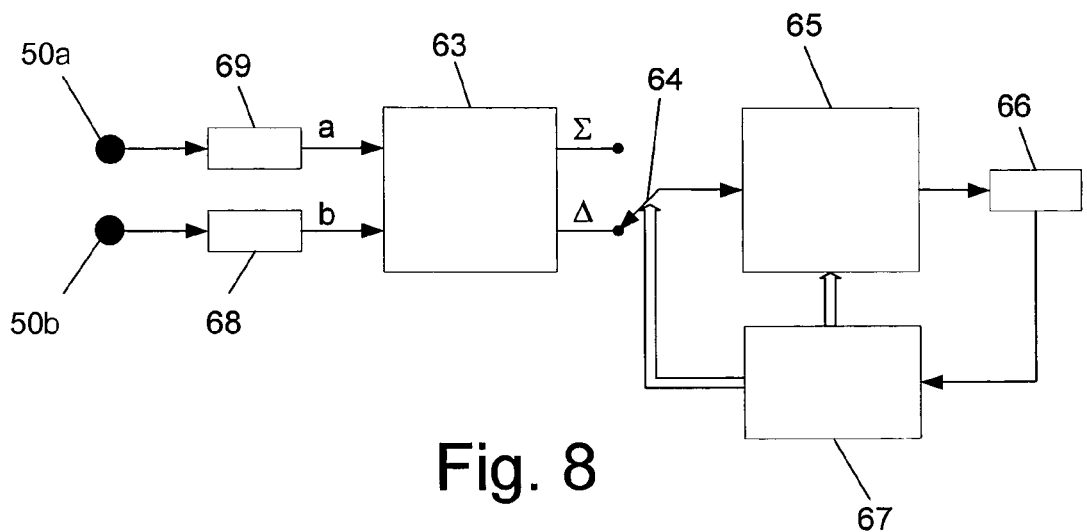
FIG. 8 shows a direction finder according to an embodiment of the invention, which comprises elements for compensating for amplitude and phase differences in the antennas or other elements, thereby to respectively cause a deep null pattern which coincides with the central axis of the direction sector of interest.

It should be noted that in practical situations the signals at antennas 50a and 50b, are not necessarily equal in amplitude and phase when communicating along axis 21. Moreover, cables from the antennas are not necessarily equal, and the 180° hybrid junction 63 is not perfect. This may result in null pattern whose null shifted off the axis 21, and/or the null depth is not maximized. The null depth is the difference in dB between the highest and the lowest values in a antenna pattern. To adjust the best possible null depth and/or the null position with respect to the central axis 21 of the direction finder, one or combination of the following additional components may be added to the direction finder, as shown in FIG. 8:

A Voltage Variable Attenuator—VVA 69: This component compensates for any amplitude difference in the antennas or other elements to acquire a deep null;

A phase shifter 68—This component compensates for any phase difference in the antennas or other elements to acquire a null coinciding with axis 21.

Figure 9:
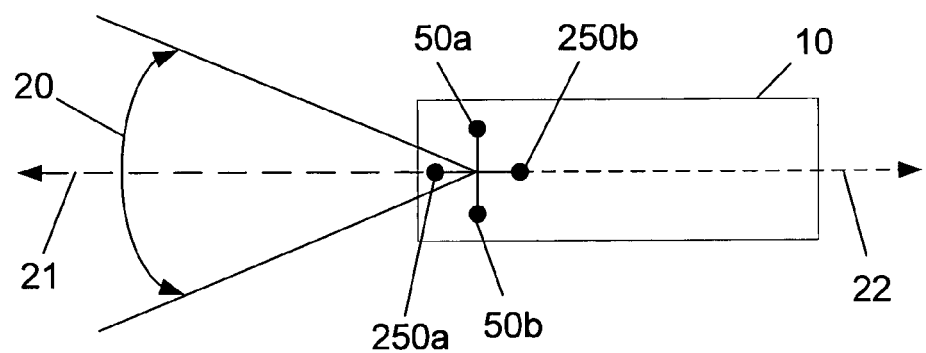
FIG. 9 shows an embodiment of the invention which further comprises two additional antennas in an end-fire configuration, for performing front and back detection discrimination.
Figure 10A:
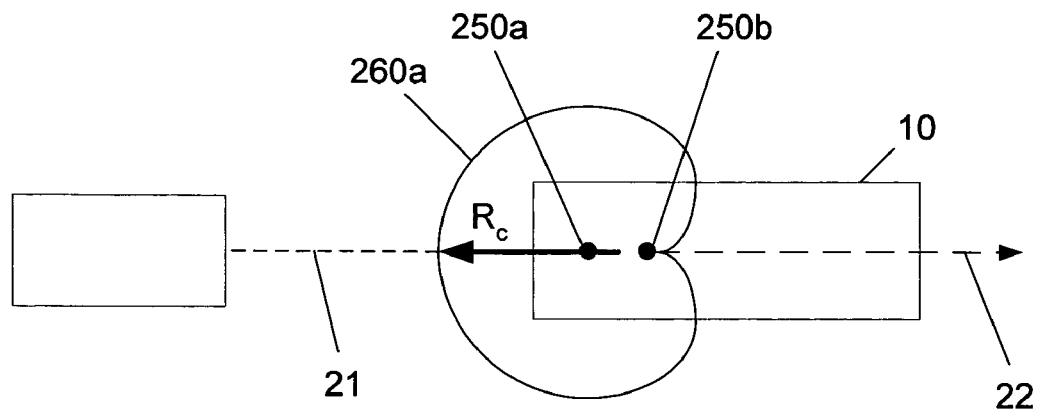
FIG. 10a shows the general form of a cardioid reference pattern which is generated by an additional 90°-phase shift to the front antenna in order to provide front vs. back discrimination.
Figure 10B:
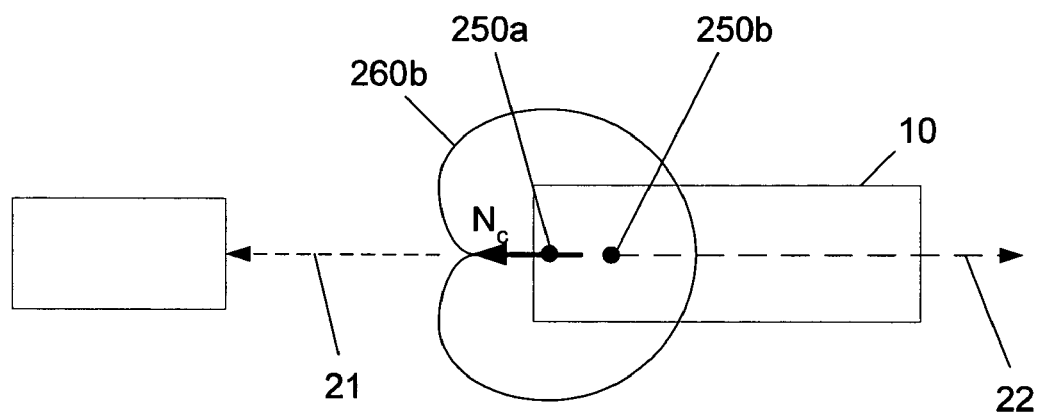
FIG. 10b shows the general form of a cardioid null pattern which is generated by an additional 90°-phase shift to the back antenna in order to provide front vs. back discrimination.

The procedure as thus far described enables the finding of targets that are located within sector 20 (see FIG. 1). However, this procedure generally cannot discriminate between targets that are located in front of the direction finder 10 and those that are located to the back of the direction finder 10, i.e., in the direction of arrow 22 (in FIG. 1). If a front vs. back discrimination is required, the following procedure may be performed. As shown in FIG. 9, two additional antennas 250a and 250b are added to the direction finder 10 in an end-fire configuration, i.e., the central axis 21 of the sector of interest coincides with the line connecting the two antennas 250a and 250b. As shown in FIGS. 10a and 10b, in addition to the abovementioned reference and null patterns 60 and 160 that are produced in stages 1 and 2 using antennas 50a and 50b respectively, "cardioid" type antenna patterns 260a and 260b are generated in stages 3 and 4 using antennas 250a and 250b. FIG. 10a shows the general form of the cardioid reference pattern 260a. In stage 3, the cardioid reference pattern is generated by an additional 90°-phase shift to the front antenna 250a. The cardioid pattern comprises a lobe, which is directed toward central axis 21, and a null directed to the back axis 22. FIG. 10b shows the general form of the cardioid null pattern 260b. In stage 4, the cardioid null pattern is generated by an additional 90°-phase shift to the back antenna 250b. The cardioid pattern comprises a lobe, which is directed toward back axis 22, and a null directed to the front axis 21. The procedure as above described with respect to the generation of the vectors R and N is repeated in the cardioid stages 3 and 4. In stage 3, i.e., when the cardioid reference pattern 260a is generated, the minimal attenuation required to lose communication is recorded, and denoted $R_c$ in dB units. Similarly, in stage 4, when the cardioid null pattern is generated, the minimal attenuation required to lose communication is also recorded, and denoted $N_c$ in dB units. The values of $R_c$ and $N_c$ directly depend on whether the direction to the target is in the front or the back (i.e., to the direction of axis 21 or axis 22). If $R_c > N_c$, it is concluded that the target is in the front of the DF 10. Otherwise, If $R_c < N_c$, it is concluded that the target is in the back of the DF 10.

Figure 11:
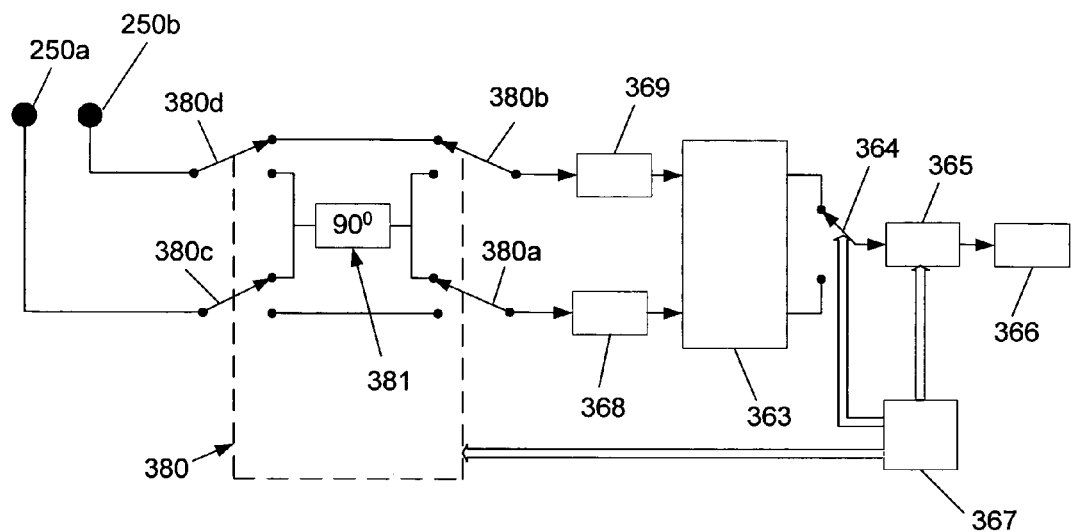
FIG. 11 illustrates in a block diagram form the general structure of a directional finder having a front and back discrimination, as described with respect to FIGS. 9, 10a and 10b.

FIG. 11 illustrates in a block diagram form the general structure of a directional finder having a front and back discrimination, as described with respect to FIGS. 9, 10a and 10b. In stage 3, switch 380 is connected in the position as shown in the figure, thus introducing an additional 90° phase shifter 381 in the path of the front antenna 250a, thereby to generate the cardioid shown in FIG. 10a. In stage 4, switch 380 is turned to the lower position shown in the figure, thus introducing the additional 90° phase shifter 381 in the path of the back antenna 250b, thereby to generate the cardioid of FIG. 10b. Processing unit 367, in addition to controlling the switch 364 and controlled attenuator 365, controls the switch 380 according to procedure described above. The rest of the elements in the figure, i.e., elements 363, 364, 365, 366, 368, and 369 are essentially the same elements 63, 64, 65, 66, 68, and 69 as discussed above.

Alternate embodiments for acquiring the 90° phase shift are: (a) including a 90° phase shift for stage 3 and 270° phase shift for stage 4 as part of phase shifter 368; and (b) using a quadrature, i.e., 90° hybrid junction instead of the 180° hybrid junction 363.

Figure 12:
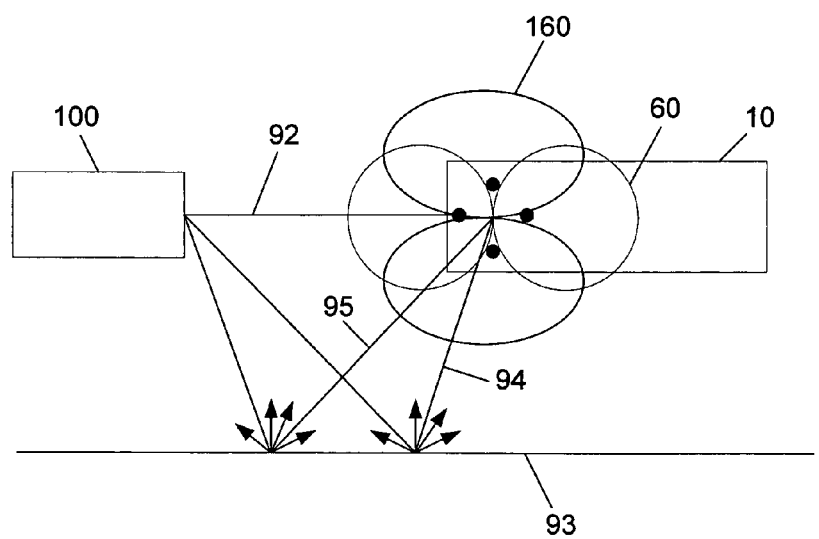
FIG. 12 illustrates how the present invention overcomes reflected waves that arrive to the direction finder of the present invention.

In various situations, reflection of waves is expected from nearby objects, such as walls, or metallic objects. As shown in FIG. 12, waves transmitted from target 100 may be scattered and reflected from nearby object such as wall 93, and arrive the direction finder 10 via many waves two of which 94 and 95 are shown in the figure. In contrast to the direct wave 92, the reflected waves are much weaker due to the following facts: (a) the reflected waves travel a loner path; (b) The reflected waves are scattered to many directions; and (c) the reflected waves from an object suffer from reflection losses. The reflected waves arrive at the DF later than the direct wave due to the longer path. These reflections are combined with the direct wave 92, distorting the amplitude, phase, and time of arrival of the signal. In prior art DF techniques that are based on measuring the signals amplitude, phase, or time of arrival, these multi-path reflections cause severe errors in the direction finding. A key novel feature of the invention is its ability to overcome multi-path reflections because the direction finding is based on the deliberate loss of communication concept, rather than measuring these signal attributes. The facts that the reflected waves are weaker than the direct wave 92 and that they are non-coherent, do not affect the existence of communication between the DF and the target. As noted above, the existence or non-existence of communication is the basis of the present invention, rather than any specific characteristic of the arrived signal. As mentioned, above, the DF procedure of the present invention is based on the difference R−N rather than absolute values of received signal levels, and therefore the procedure of the present invention is also not affected by the distance between the target and the DF, as long as they can communicate.

Figure 13:
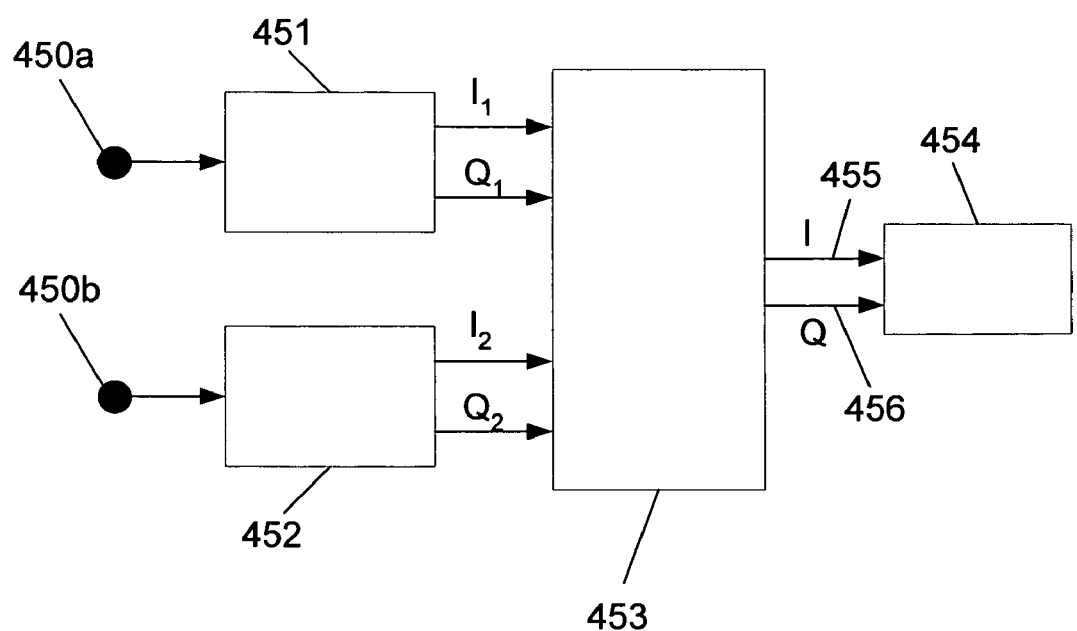
FIG. 13 illustrates in block diagram form the software based implementation of the present invention.

In yet another embodiment, the DF technique as described above is implemented by software rather than hardware. In this embodiment, the same reference and null patterns of stages 1 and 2 respectively as mentioned with respect to FIGS. 3 and 4 are generated digitally. FIG. 13 generally illustrates in block diagram form the structure of the software based implementation. The first antenna 450a is connected to a first RF channel (radio receiver) 451. The second antenna 450b is connected to a second RF channel (radio receiver) 452. The ADC (Analogue to Digital Converter—not shown) (which may be a part of the radio receiver, or separate thereof) outputs of the RF channels are named the I/Q (In-phase/Quadrature) ports. The first RF channel 451 outputs are denoted $I_1$ and $Q_1$. The second RF channel 452 outputs are denoted $I_2$ and $Q_2$. Processing unit 453 receives $I_1$ and $I_2$ and $Q_1$ and $Q_2$ inputs, performs the direction finding technique by calculating new I and Q based on said inputs, and conveys over lines 455 and 456 respectively the newly calculated I and Q to the base-band component 454. In stage 1, the reference pattern is digitally generated by the sums $I=I_R=I_1+I_2$ and $Q=Q_R=Q_1+Q_2$. In stage 2. the null pattern is digitally generated by the differences $I=I_N=I_1-I_2$ and $Q=Q_N=Q_1-Q_2$. The deliberate attenuation which is performed in the hardware embodiment by the controlled attenuator 65, is replaced herein by a digital attenuation of the received signals represented by $I_1, Q_1$, and $I_2, Q_2$. In stage 1 the values of $I_R$ and $Q_R$ are reduced simultaneously, and in stage 2 the values of $I_N$ and $Q_N$ are reduced simultaneously. In stage 3 the values of $I_{Rc}$ and $Q_{Rc}$ are reduced simultaneously, and in stage 4, the values of $I_{Nc}$ and $Q_{Nc}$ are reduced simultaneously. The compensation for any amplitude and phase difference which was performed in the hardware implementation by VVA 69 and phase shifter 68, is performed in the software implementation digitally by adding correction factors I', Q', I", and Q", where the correction factors are digital values, that are either positive or negative. More specifically in stage 1, $I=I_R=I_1+I_2+I'$, and $Q=Q_R=Q_1+Q_2+Q'$. In stage 2 $I_N=I_1-I_2+I''$, and $Q_N=Q_1-Q_2+Q''$. In stages 3 and 4 the additional 90° phase shift is performed in a similar way by adding or subtracting digitally the respective factors. More specifically, in stage 3, $I=I_{Rc}=I_1-Q_2+I'''$ and $Q=Q_{Rc}=I_2+Q_1+Q'''$ and in stage 4, $I=I_{Nc}=I_1+Q_2+I''''$ and $Q=Q_{Nc}=Q_1-I_2+Q''''$. Correction factors I''', Q''', I'''', and Q'''' are added in a similar manner to stages 1 and 2 for any amplitude and phase difference. It should be noted that all the discussions throughout this application with respect to FIGS. 1, 2, 3, 4, 6a, 6b, 7, 9, 10a, 10b, 12, and 13 are applicable also for the software embodiment discussed herein.

It should be noted that the novelty of the hardware implementation generally resides in all the elements of FIGS. 5, and 8, excluding the wireless communication unit 66. The novelty of the hardware implementation of FIG. 11 generally resides in all the elements shown in the figure, excluding the wireless communication unit 366. The novelty of the software implementation of FIG. 13 essentially resides in the processing unit 453.

As has been shown, the present invention provides a procedure for finding the direction to one or more targets, which is based on yes/no communication. The type of communication used between the direction finder and the target is generally irrelevant to the invention, as long as a wireless communication is maintained during a "yes" communications state, and a loss of wireless communication occurs during a "no" communication state. The procedure uses an attenuator which intentionally causes loss of communication, wherein the attenuator may attenuate the received signal, the transmitted signal or both. The invention determines the difference between the reference pattern and the null pattern in order to find if a target is within a sector of interest. The reference pattern may be directional or omni-directional. The invention uses at least two antennas, typically omni-directional but also may be directional, for finding the direction. For the reference pattern, also a single antenna may be used. The deliberately induced attenuation (either by the controlled attenuators 65 or 365 in the hardware embodiments, or digital attenuation in the software embodiments) may be performed gradually, or according to a search algorithm. In addition, the order by which the reference and null patterns are generated is replaceable. Furthermore, the attenuation may start with the highest value where communication does not exist, towards communication existence. It should also be noted that the target is not required to be equipped with direction finding, but it may include such a feature.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. Method for determining whether a target is within a direction sector of interest of a direction finder, which comprises:
    a. predefining said direction sector of interest as a specific threshold difference between an R reference value and an N null value;
    b. providing at least two antennas arranged in a broad-side configuration within the direction finder;
    c. generating an in-phase reference pattern using at least one of said antennas, and establishing wireless communication between the direction finder and said target;
    d. attenuating the wireless communication signal between the direction finder and said target until the wireless communication is lost, and recording the attenuation value which corresponds to said loss of wireless communication as the R reference value;
    e. generating an out-of-phase null pattern using at least two of said antennas, and re-establishing wireless communication between the direction finder and said target;
    f. attenuating the wireless communication signal between the direction finder and said target until the wireless communication is lost, and recording the attenuation value which corresponds to said loss of wireless communication as the N null value;
    g. determining whether the difference R−N is above or below said threshold difference, wherein a difference R−N above said threshold is an indication that the target is within said direction sector of interest, and wherein a difference R−N below said threshold is an indication that the target is out of said direction sector of interest.

2. Method according to claim 1, wherein a loss of wireless communication is a loss of handshake between the direction finder and the target.

3. Method according to claim 1, wherein a larger difference R−N is an indication that the direction to the target is closer to a central axis of said direction sector of interest.

4. Method according to claim 1, wherein the smaller said predefined threshold value is, the narrower said direction sector of interest becomes, and vice versa, the larger said predefined threshold is, the a wider said direction sector of interest becomes.

5. Method according to claim 1, wherein the order of generation of the reference and null patterns, including said corresponding attenuations and recordings is replaceable.

6. Method according to claim 1, wherein the wireless communication signal which is attenuated is the received signal at the device finder.

7. Method according to claim 1, wherein the wireless communication signal which is attenuated is the transmitted signal from the device finder.

8. Method according to claim 1, wherein the attenuations are performed gradually.

9. Method according to claim 1, wherein said attenuations are performed according to a specific selected procedure until said loss of wireless communication.

10. Method according to claim 1, wherein said attenuations begin from 0 dB attenuation, and the attenuation values are measured in dB.

11. Method according to claim 1, wherein the order of determination of N and R respectively is replaceable.

12. Method according to claim 1, for further providing a back vs. front discrimination, which further comprising:
    a. providing at least two antennas that are arranged in an end-fire configuration within the direction finder;
    b. generating a quadrature phase cardioid reference pattern using at least two of said antennas that are arranged in an end-fire configuration, and establishing wireless communication between the direction finder and said target;

c. attenuating the wireless communication signal between the direction finder and said target until the wireless communication is lost, and recording the attenuation value which corresponds to said loss of wireless communication as the $R_c$ reference value;

d. generating another quadrature phase cardioid null pattern using at least two of said antennas that are arranged in an end-fire configuration, and re-establishing wireless communication between the direction finder and said target;

e. attenuating the wireless communication signal between the direction finder and said target until the wireless communication is lost, and recording the attenuation value which corresponds to said loss of wireless communication as the $N_c$ null value;

f. determining whether the difference $R_c$–$N_c$ is positive or negative, wherein a positive $R_c$–$N_c$ is an indication that the target is located to the front of the direction finder, and wherein a negative $R_c$–$N_c$ is an indication that the target is located to the back of the direction finder.

13. Method according to claim 12, wherein said reference and null cardioid patterns are generated while introducing a 90° phase shift at a front and back of said end-fire antennas, respectively.

14. Method according to claim 1, wherein the generation of the in-phase reference pattern, and of the out of phase null pattern, as well as the respective attenuations of the signals are performed digitally by a processing unit.

15. Method according to claim 12, wherein the generation of the quadrature phase cardioid reference pattern, and of the another quadrature phase cardioid null pattern, as well as the respective attenuations of the signals are performed digitally by a processing unit.

16. Method according to claim 14, wherein said processing unit receives $I_1$ and $Q_1$ from a first receiver which in turn receives the signal via a first of said two antennas, and $I_2$ and $Q_2$ from a second receiver which in turn receives the signal from a second of said two antennas, and wherein said processing unit outputs a newly calculated corresponding I and Q to a baseband component.

17. A direction finder for determining whether a target is within a predefined direction sector of interest, which comprises:
   a. at least two antennas that are arranged in a broad-side configuration;
   b. a wireless communication unit for establishing communication with a target via a wireless communication signal;
   c. a variable attenuator for attenuating said wireless communication signal;
   d. a hybrid junction for enabling wireless communication of said signal via said antennas in a generated in-phase or out-of phase patterns; and
   e. a processing unit for:
      e.1. switching at a stage 1 the hybrid junction to generate an in-phase pattern, attenuating the signal until the wireless communication is lost, and recording the attenuation value which corresponds to said loss of wireless communication as an R reference value;
      e.2. switching at a stage 2 the hybrid junction to generate an out-of-phase pattern, attenuating the signal until the wireless communication is lost, and recording the attenuation value which corresponds to said loss of wireless communication as an N null value;
      e.3. determining the difference R–N, wherein a difference above a predefined threshold means that the target is within said direction sector of interest, and a difference below said predefined threshold means that the target is out of said direction sector of interest.

18. A direction finder according to claim 17, for further discriminating between targets that are at the front or back of the direction finder, further comprising:
   f. a phase shifter;
   g. at least two antennas that are arranged in an end-fire configuration;
   h. and wherein said processing unit is further used for:
      h.1. switching at a stage 3 the phase shifter to generate a quadrature phase cardioid reference pattern at said two antennas that are arranged in an end-fire configuration, attenuating the signal until the wireless communication is lost, and recording the attenuation value which corresponds to said loss of wireless communication as an $R_c$ cardioid reference value;
      h.2. switching at a stage 4 the phase shifter to generate another quadrature phase cardioid null pattern at said two antennas that are arranged in an end-fire configuration, attenuating the signal until the wireless communication is lost, and recording the attenuation value which corresponds to said loss of wireless communication as an $N_c$ cardioid null value;
      h.3. determining the difference $R_c$–$N_c$, wherein a positive difference indicates that the target is to the front of the direction finder, and a negative difference indicates that the target is to the back of the direction finder.

19. A direction finder according to claim 17, wherein said hybrid junction is a 180° hybrid junction.

20. A direction finder according to claim 18, wherein said phase shifter is a 90° phase shifter.

* * * * *